Figure 1:
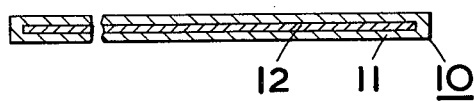

March 16, 1965 P. R. SIMPSON 3,173,843
PLATE-TYPE NUCLEAR FUEL ELEMENTS
Filed Oct. 21, 1959 2 Sheets-Sheet 1

INVENTOR
PHILIP ROSS SIMPSON

March 16, 1965   P. R. SIMPSON   3,173,843
PLATE-TYPE NUCLEAR FUEL ELEMENTS
Filed Oct. 21, 1959   2 Sheets-Sheet 2
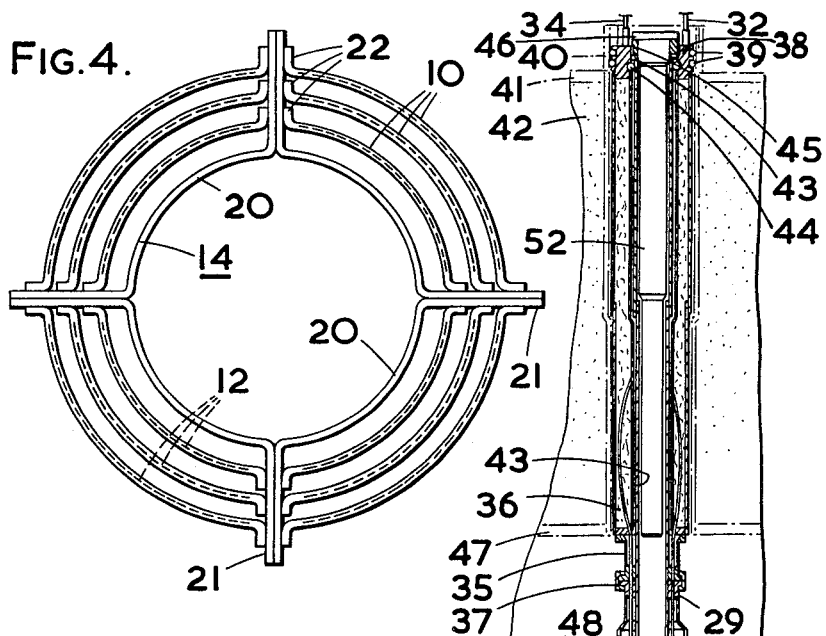
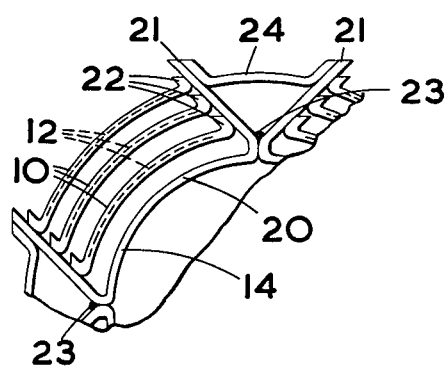
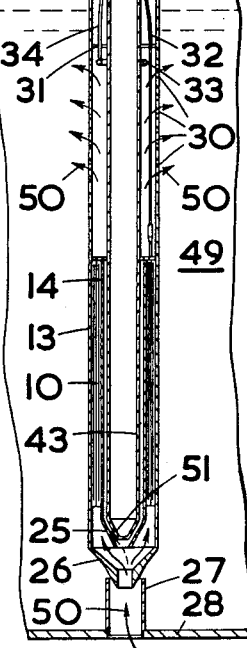
INVENTOR
PHILIP ROSS SIMPSON United States Patent Office 3,173,843
Patented Mar. 16, 1965

3,173,843
PLATE-TYPE NUCLEAR FUEL ELEMENTS
Philip Ross Simpson, Preston, England, assignor to United Kingdom Atomic Energy Authority, London, England
Filed Oct. 21, 1959, Ser. No. 847,733
Claims priority, application Great Britain, Oct. 24, 1958, 34,203/58
5 Claims. (Cl. 176—78)

This invention relates to fuel elements for nuclear reactors, the elements being constructed with plate type fuel ("plate-type fuel elements").

A plate type fuel element currently in use for heavy water moderated and cooled high flux material testing reactors comprises slightly curved plates of enriched uranium alloyed with aluminium and clad in aluminium (see, for example, Paper 953 of the 1955 Geneva Conference). The plates are spaced apart, mounted parallel in an aluminium frame, and secured to the frame by a dip brazing process. The complete element has an approximately square overall section and a number (for example, 26) of such elements are assembled in parallel relation, spaced apart a distance about equal to their transverse dimensions and immersed in a tank of heavy water to make a reacting core. Heavy water coolant is circulated through the spaces between the plates. The neutron flux created by such a reacting core is exploited by having a series of thimble tubes dipping into the core (and for this purpose some of the fuel can be removed) or specimen tubes located around the core or under or above the core into which specimens can be inserted for irradiation.

Whilst the performance of such elements are generally satisfactory certain disadvantages have become apparent. In the first place the slight curvature in the plates can become reversed should the water coolant pressure drop through the fuel element become large enough. This reversed curvature brings parts of some of the plates closer together so that overheating takes place which may well cause further plate curvature to aggravate the position.

In the second place, it is considered that the neutron flux is possibly not being best exploited as the introduction of thimbles or specimen tubes can only be made at the periphery of the core or by removing fuel from the core.

It has also been proposed to provide a plate-type fuel element in which the plates are arcuate and are assembled by being secured to adjacent plates along their edges to provide a fuel element of concentric tubular form (see, for example, page 44 of "Nucleonics" vol. 16 No. 7—July 1958). Such a design is effective in overcoming the problems associated with the parallel-plate fuel-element previously referred to.

It is an object of the invention to provide a plate-type fuel element which has improved mechanical stability.

It is also an object of the invention to provide improved fabrication techniques of plate type fuel elements.

It is also an object of the invention to provide a plate-type fuel element which has improved safety characteristics in the event of coolant failure.

A plate type fuel element according to the invention comprises a series of arcuate fuel plates secured along their edges to transverse supports so as to form a series of connected spaced concentric fuel tubes, said supports forming a plurality of continuous heat conducting paths from the inner to the outer concentric tubes.

Embodiments of the invention will now be described by way of example with reference to the accompanying drawings wherein:
FIG. 1 is an enlarged section of a fuel plate,
FIGS. 2 to 4 are plan views of various forms of fuel element,
FIG. 5 is a fragmentary view of another form of fuel element, and
FIG. 6 is a longitudinal sectional elevation of a part of a reactor core equipped with a fuel element as shown in any of the FIGS. 2 to 5.

In FIG. 1 a fuel plate 10 is shown consisting of a fuel member 12, clad with aluminium 11. The member 12 consists of 22.4% of enriched uranium alloyed with aluminium. The member 12 is made by rolling billet to strip, then cutting and trimming the strip. It is then clad with aluminium, welded along the edges, rolled again and trimmed. The dimensions of the plate are typically 25 inches long and 2.85 inches wide. They are subsequently curved to suit the frame that they are to be assembled in. (A full description of process of manufacture exists in the above Geneva Conference reference.)

Figure 2:
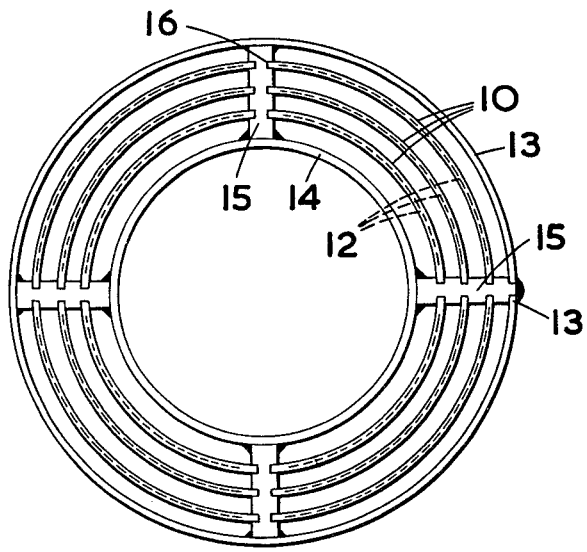
Figure 3:
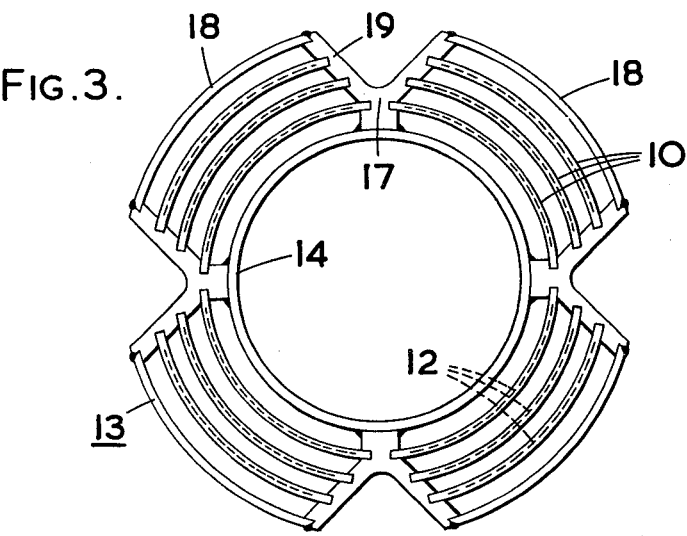

In FIG. 2 there is shown a frame consisting of an inner elongated aluminium support tube 14, an outer elongated aluminium support tube 13 concentric with the tube 14 and radial support members 15 extending between the tubes extending over the whole length of the tube 14. The plates 10 concentric with the tubes 13, 14 are located in grooves 16 in the radial support members 15.

In the manufacture of the element shown in FIG. 2 the plates 10 are made of appropriate widths and then curved. The support members 15 are argon-arc welded to the inner tube 14 and the outer tube 13 placed over the members 15 and end welded to them. Alternatively, the tube 13 may be fabricated in sections which are butt welded to the support members 15 as shown by way of example for the support member carrying the reference numeral 15 in FIG. 2. The plates 10 are secured in grooves 16 in the support members 15 by any suitable means such as brazing. Alternatively the support members 15 and plates 10 may be assembled together, placed in the annulus between the tubes 13 and 14, and brazed to the tubes 13 and 14.

In FIG. 3 the modification is shown of Y-shaped radial support members 17 extending over the whole length of the tube 14 and the outer tube 13 is broken into four sections 18 which are argon-arc welded to the legs 19 of the support members. The method of fabrication is similar to that described above with reference to FIG. 2, except that the plates 10 are all of the same dimensions and the sections 18 are welded to the members 17 along their whole length.

An alternative method of manufacturing either elements using the straight support members 15 of FIGURE 2 or the Y-shaped support members 17 of FIG. 3 is to hold the plates 10 in a mould and cast the support members 15 or 17, inner tube 14, and outer tube 13, around the plates 10 by gravity or pressure die casting techniques. If required, the inner tube 14 and/or outer tube 13 could also be held in the mould and the support members only cast on.

In FIG. 4 the inner elongated supports tube 14 is made of four sections 20 with flanges 21 along their edges. The fuel plates 10 are also supplied with aluminium flanges 22 along their edges. The assembly is made completely by seam welding techniques in the following manner. One section 20 is taken and has welded to it the innermost fuel plate 10 by seam welding the flanges 22 to the flanges 21. The other two fuel plates 10 are similarly attached to the flanges 21 so that one quadrant is made. The other three quadrants are similarly made and the assembled fuel element made by seam welding flanges 21 together. No outer tube has been shown in this construction but it will be appreciated that one can readily be added in four quadrants in the same manner as used to assemble the fuel plates.

FIG. 5 combines the equal length plate feature of FIG. 3 with the welded construction of FIG. 4. The Y-shaped radial support members now become the flanges 21 along the edges of the inner tube sections 20, a weld 23 being provided at the fork between adjacent flanges 21 and a stiffener 24 being provided across the mouth of the fork. Again an outer tube can be added in sections if desired.

In FIG. 6 the fuel plates 10 of an element as shown in FIG. 2 are shown between the inner tube 14 and outer tube 13. The tube 14 extends downwards to a conical mouthpiece 25 and the tube 13 extends downwards to a conical mouthpiece 26 fitting in a stub tube 27 in a plate 28. The tube 13 extends upwards to a flange 29 and is provided with a series of coolant outlet holes 30. A closure plate 31 is provided in the tube 13. A thermocouple cable 32 is brought from the fuel plates 10 and a coolant sampling ring 33 exists just below the plate 31. A pipe 34 leads from the ring 33 and passes with the cable 32 through the flange 29.

The flange 29 carries a flanged end support 35 attached to a removable shield plug 36. The flange 29 is held to the support 35 by a split clamping ring 37. The plug 36 is terminated with an end plug 38 fitted with O-ring seals 39. The seals 39 seal with a stub tube 40 welded to the top plate 41 of a biological shield 42. A thimble specimen irradiation tube 43 extends from near the mouthpiece 25 to the end plug 38 into which it is sealed by O-rings 44. The tube 43 terminates in a flange 45 and is closed with a plate 46 and fitted with a removable shield plug 52.

The coolant and moderator are both heavy water stored in the moderator compartment 49 defined by the plate 28 and a base plate 47 of the shield 42. (The lever of the water is indicated by the line 48). The coolant is drawn from the compartment 49 and pumped to the void below the plate 28 which functions as a header tank feeding a number of stub tubes 27. The coolant then flows between tubes 13 and 14 to cool the fuel plates 10 and then returns to the compartment 49 via the outlet holes 30 (Flow indicated by arrows 50). A small quantity of coolant flow divides from the main stream (as indicated by arrow 51) and passes along the annulus between tubes 14 and 43 in order to keep the tube 43 cooled. It subsequently joins the main flow and passes through the holes 30.

The fuel element, before being introduced into the reactor, is joined with shield plug 36 by the ring 37 and is then lowered into the compartment 49 until the mouthpiece 26 rests on the tube 27. The tube 43 is then lowered through the shield plug 36 to the position shown in the drawing. The plug 52 is inserted and closure made with the plate 46.

FIGS. 2, 3, 4 & 5 show a number of advantages. The provision of support plates (15 in FIG. 2; 17 in FIG. 3; 21 in FIG. 4 and FIG. 5) provide spacing for the fuel plates along the length of the element and a lateral rigidity, both features making for improved mechanical stability.

Whilst brazing has not been dispensed with in all the arrangements shown in FIGS. 2–5, it is seen in FIGS. 2 and 3 that welding is in part introduced whilst in FIGS. 4 and 5 a completely welded assembly is offered. It is considered that welding is a superior technique to brazing, each weld being capable of inspection after it has been made.

The safety aspect of the fuel elements have been well provided for in the event of loss of coolant indicated by arrows 50. The conductivity paths offered by the support plates are adequate to ensure that heat from the innermost fuel plates will find its way to the large moderator volume 48 and thereby avoid melting of the fuel plates with the risk of contamination of the reactor or other risks. The arrangements shown in FIGS. 3 and 5 are particularly attractive in this respect as not only is a good conductivity path provided but a short path also exists together with a large surface area exposed to the moderator water.

The arrangements of FIGS. 3 and 5 also show the advantage of uniform size of fuel plates which simplifies or hence reduces the cost of fabrication of the plates.

Whilst all the FIGS. 2–5 show an inner tube 14 this tube could be dispensed with so long as an outer tube is provided. It would then be practicable to make the tube 14 a part of a thimble or specimen tube removable from the fuel element thus effecting, for a reactor used for irradiation purposes, a saving in material in the reactor and hence an improved neutron economy.

Whilst the invention has been described above in relation to heavy water moderated and cooled material testing reactors, the application of the invention is not considered to be limited to this application. The advantages offered by a concentric tube fuel element in respect of neutron economy and large surface area relative to volume of fuel are such as to make its use attractive in both liquid, such as sodium, and gas cooled reactors.

The concentric tube fuel element is readily adaptable to re-entrant type of cooling. For example, in the arrangement in FIG. 6 the mouthpiece 26 could be closed off and coolant fed downwards over the fuel plates 10 and upward along the tube 43.

I claim:
1. A plate-type fuel element comprising an elongated support tube, a plurality of symmetrically arranged support members integral with the tube and projecting therefrom in a generally radial direction, each of the support members being in one piece and continuous from one to the other of the lengthwise ends of said support tube, and a series of curved and straight-edged elongated fuel plates disposed in identical sets between each pair of mutually adjacent support members with the straight edges of the individual fuel plates secured to the support members of said pair, each set being separated from the adjacent sets by the said support members, and the several fuel plates in each of said sets being secured in radially spaced relationship with the curvature thereof directed radially outwards, the series of fuel plates thereby forming a series of concentric fuel tubes inter-connected structurally by said support members, and the support members forming a plurality of continuous heat conducting paths from the inner to the outer concentric fuel tubes.

2. A plate-type fuel element as set forth in claim 1 wherein said support members are substantially Y-shaped and present planar radially divergent surfaces for edgewise securing of said fuel plates which surfaces establish a parallel relationship between the opposing surfaces of each of said pairs of mutually adjacent support members, the fuel plates of said series being all of equal width between the straight edges thereof.

3. A plate-type fuel element comprising an elongated multi-section tubular support fabricated of like elongated sections of arcuate intermediate portions and continuous flanges at the elongated edges of the intermediate portions, which sections are welded together as between circumferentially adjacent sections at least in the region of the flange roots, said flanges projecting outwardly in welded pairs in a generally radial direction and presenting planar surfaces to define spaces of generally sectorial outline between adjacent flange pairs, and a series of arcuately curved and straight-edged elongated fuel plates disposed in identical sets in each of said spaces with the straight edges of the individual fuel plates welded to said planar surafces, the several fuel plates in each of said sets being secured in radially spaced relationship with the curvature thereof directed radially outwards, the series of fuel plates thereby forming a series of concentric fuel tubes interconnected structurally by said flanges, and the flanges forming a plurality of continuous heat conducting paths from inner to outer concentric fuel tubes.

4. A plate-type fuel element as set forth in claim 3 wherein the flanges of each of said welded pairs are splayed apart to establish a parallel relationship between said planar surfaces defining said spaces, the fuel plates of said series being all of equal width between the straight edges thereof.

5. A plate-type fuel element comprising a first elongated support tube, a second elongated support tube concentric with and spaced from the first said elongated support tube, a plurality of symmetrically arranged support members in the space between the support tubes and integrally projecting there-between a generally radial direction and continuous from one to the other of the lengthwise ends of the said support tubes to define enclosed and distinct spaces of generally sectorial outline between adjacent members, and a series of arcuately curved and straight-edged elongated fuel plates disposed in identical sets in each of the said enclosed spaces with the straight edges of the individual fuel plates secured to the support members bonding the enclosed space, each set being separated from the adjacent sets by the said support members, and the several fuel plates in each of said sets being secured is a radially spaced relationship with the curvature thereof directly radially outwards, the series of fuel plates thereby forming a series of fuel tubes concentric with the support tubes and inter-connected structurally by said support members, and the support members forming a plurality of continuous heat conducting paths from the inner to the outer concentric fuel tubes.

References Cited in the file of this patent

UNITED STATES PATENTS

| | | |
|---|---|---|
| 2,831,806 | Wigner | Apr. 22, 1958 |
| 2,832,732 | Wigner | Apr. 29, 1958 |
| 2,914,454 | Gurinsky | Nov. 24, 1959 |
| 2,977,297 | Evans et al. | Mar. 28, 1961 |
| 2,978,398 | Metcalf et al. | Apr. 4, 1961 |
| 3,049,484 | Zinn | Aug. 14, 1962 |
| 3,074,873 | Kling et al. | Jan. 22, 1963 |

FOREIGN PATENTS

| | | |
|---|---|---|
| 1,041,178 | Germany | Oct. 16, 1958 |

OTHER REFERENCES

Nucleonics, November 1956, pp. 138–144.

Gruber: "A New Approach to a Materials Testing Reactor" (paper No. 57-AIF-34 of the 4th Annual Conference of the Atomic Industrial Forum), October 1957, pages 1–6.

Nucleonics, July 1958, page 44.